United States Patent [19]

Sone et al.

[11] Patent Number: 5,025,338

[45] Date of Patent: Jun. 18, 1991

[54] AUTOMATIC DISC CARRYING AND PLAYING DEVICE

[75] Inventors: Toshiyuki Sone, Kanagawa; Takehiko Matsumoto, Ibaragai; Nobuya Omotezako, Kanagawa; Keiji Kawasuji, Ibaragi, all of Japan

[73] Assignee: Car Mate Mfg. Co., Ltd., Tokyo, Japan

[21] Appl. No.: 515,118

[22] Filed: Apr. 27, 1990

[51] Int. Cl.$^5$ .................. G11B 15/68; G11B 17/04
[52] U.S. Cl. .................. 360/99.06; 360/98.06; 360/92; 369/194
[58] Field of Search .......... 360/92, 94, 99.06, 98.04, 360/98.01, 98.06, 98.05; 369/38, 41, 75.2, 193, 194; 414/267, 272, 280

[56] References Cited

U.S. PATENT DOCUMENTS 4,479,210 10/1984 Nakayama .................. 360/98.04
4,974,102 11/1990 Hamachi et al. .................. 360/92

Primary Examiner—Aristotelis M. Psitos
Assistant Examiner—Alfonso Garcia
Attorney, Agent, or Firm—Koda and Androlia

[57] ABSTRACT

A disk player with a disk carrier and disk magazine including a pair of reciprocating slide plates provided with guide holes for the disk carrier and the disk magazine. When the slide plates make a reciprocating motion, the disk carrier and the disk magazine both provided on the slide plates are moved via a combination of the guide holes so that a selected disk is withdrawn from the disk magazine and, after being played, returned to the disk magazine.

6 Claims, 6 Drawing Sheets

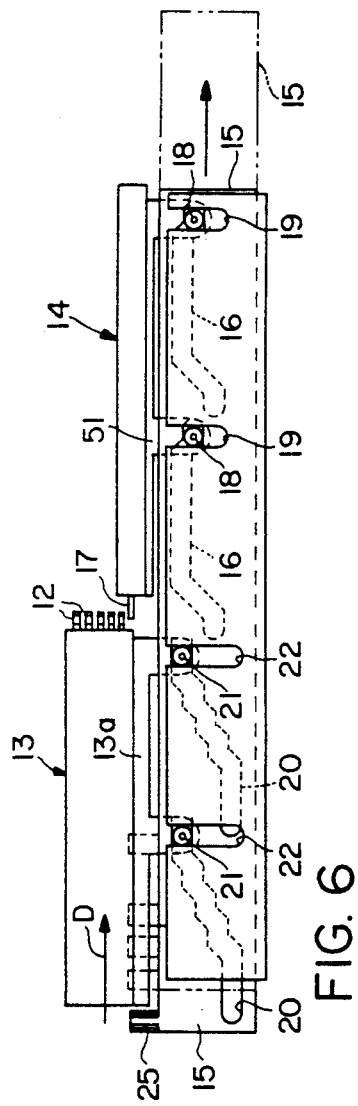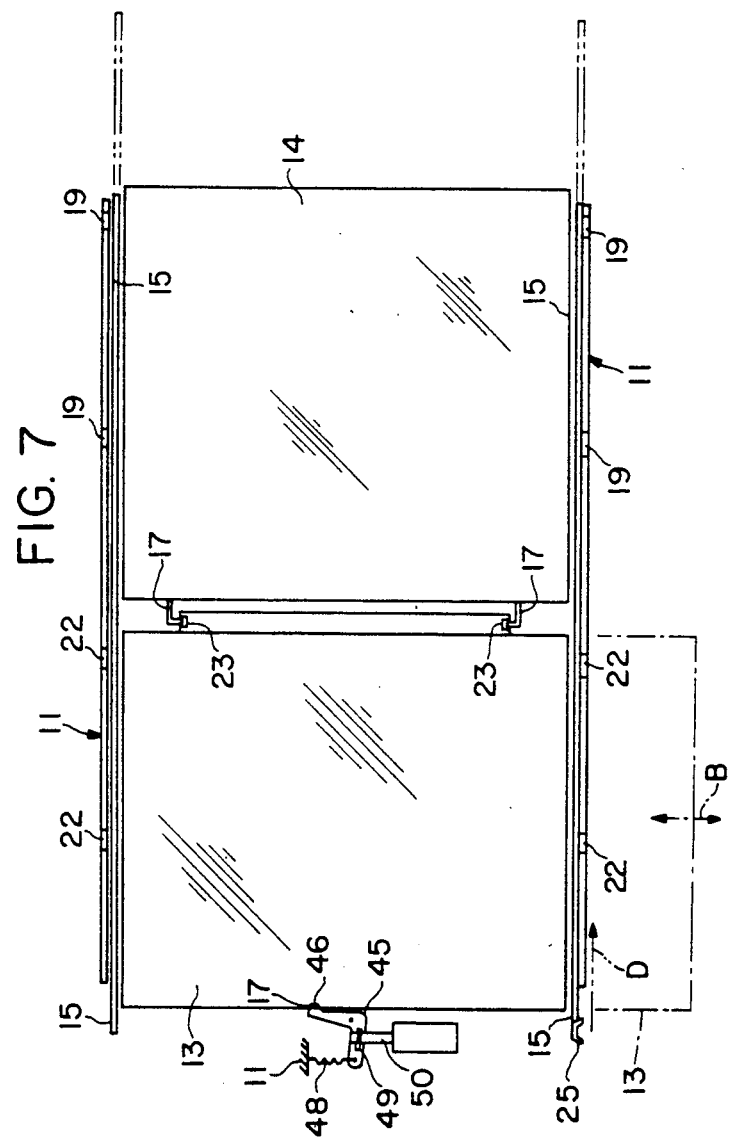

AUTOMATIC DISC CARRYING AND PLAYING DEVICE

BACKGROUND OF THE INVENTION

1. Field of the Invention

The present invention relates to an improvement in a disk player having an automatic disk conveying mechanism.

2. Prior Art

A conventional disk player having a mechanism to carry a disk from disk magazine to a disk read-out unit is generally designed as follows: A disk magazine which contains disk trays one on top of the other is secured on a base frame. A disk carrier and a disk read-out unit are also provided on the base frame, and the disk carrier moves up and down in front of the disk magazine. Upon receiving a selection signal, the disk carrier is raised and draws out a selected disk tray from the disk magazine. The carrier is then moved down to bring the disk to a specific read-out position of the disk read-out unit so that the disk is played there.

FIG. 10 illustrates a typical structure seen in conventional disk players wherein a driving gear 1 meshes with a large gear 2, and the large gear 2 meshes with three small gears 3. Each of these small gears 3 has a screw rod 4, and these screw rods 4 engage with a base plate 5. The disk carrier (not shown) and read-out unit (not shown) are mounted on the base plate 5. A disk magazine 6 containing disks 7 is installed in front of the base plate 5.

This prior art system, however, has several problems in that since the disk magazine 6 is in a position, and the corresponding disk carrier and read-out unit (both not shown) are moved up and down to pick up a selected disk tray and read out the disk in the disk tray via a gear train, structure-wise the system must be very precise in order to accurately set the selected disk in the read-out unit. Thus, a very precise and complex mechanism is required.

Furthermore, the mechanism used to set the disk in the read-out unit uses a magnetic disk presser. This disk presser is activated via another mechanism (not that for the disk carrier) after the disk carrier is moved to a disk pick-up position and the selected disk is set at the read-out position.

Thus, in prior art mechanisms, the up-and-down motion and the disk pressing action are executed using separate driving means. As a result, the structure becomes complex, creating high manufacturing costs. In addition, since the separate driving means are required for executing different actions, the size of the entire system tends to become large.

In addition, a special means is required to prevent erroneous ejection of the disk magazine. This causes the system to be even more complex and expensive to manufacture.

SUMMARY OF THE INVENTION

In view of the problems found in the prior art, it is a general object of the present invention to provide a device for playing disks which is less complex in structure, can function well without the high degree of precision required in the prior art, is less costly to manufacture, and in general overcomes the problems of the prior art.

It is thus a primary object of the present invention to provide a device for playing disks wherein a disk magazine is raised and lowered via selective operation so as to avoid complex structure as seen in the prior art.

It is another object of the present invention to provide an device for playing disks wherein a disk is securely pressed on a disk read-out unit via a disk pick-up and setting action.

It is a further object of the present invention to provide a device for playing disks wherein erroneous ejection of the disk magazine can be automatically prevented in association with the disk pick-up and setting action.

The above objects are accomplished by improvements made to an automatic disk conveying and playing device wherein disk trays are housed in a disk storage section of a disk magazine one on top of the other, and angled C-shaped indentations formed symmetrically on both corners of the disk tray sticking out of the storage section are caught by hooks of a disk carrier (which picks up from and then returns the disk to the disk magazine) so that a selected disk tray is conveyed to the disk read-out unit provided on a base frame. After the disk is played, the disk tray containing the disk is returned to and stored in the storage section of the disk magazine by releasing the hook from the indentations on the disk tray.

The main improvement made in the above-described device is that a pair of slide plates, which slide back and forth on the base frame, create the disk pick-up and returning motion and the up and down motion of the disk magazine.

Each of the slide plates is provided with a pair of long lateral guide holes and a pair of stepped guide holes next to each other.

Each of the long lateral guide holes, which guide a housing containing a disk carrier therein (or a disk tray pick-up and returning unit), comprises an ascending guide part, a horizontal guide part and a descending guide part, which are all continuously formed. The ascending guide part guides the hook of the disk carrier which engages with the indentations on the disk tray stored in the disk magazine. The length of the horizontal guide part corresponds to the total thickness of the disk trays in the disk magazine. The descending guide part assists the disk tray when it is descending, that is when a disk tray, which has been picked up by the hook are moved to a read-out position of the disk read-out unit.

The stepped guide hole, which guides the disk magazine up and down, comprises a top step part, stepped guide part and a bottom step part, which are all continuously formed. The number of steps of the stepped guide part corresponds to the number of disk trays in the disk magazine, and the bottom step part corresponds to the descending guide part of the long lateral guide hole.

The present invention further includes an arm which is pivotally mounted to the base frame and has a magnetic disk presser at its free end. One side of the disk carrier is rotatably connected to a middle portion of the arm so that the arm pivotally moves and keeps the disk at a specified position.

In addition, a means for preventing the erroneous ejection of the disk magazine is provided on one of the slide plates so that it is moved to the front of a magazine compartment when the slide plate is moved, thus automatically preventing the disk magazine from being erroneously ejected.

BRIEF DESCRIPTION OF THE DRAWINGS

FIG. 6 is a front view of a disk magazine to which a means for preventing erroneous ejection is about to be actuated;

FIG. 7 is a plan view of FIG. 6;

DETAILED DESCRIPTION OF THE INVENTION

Figure 1:
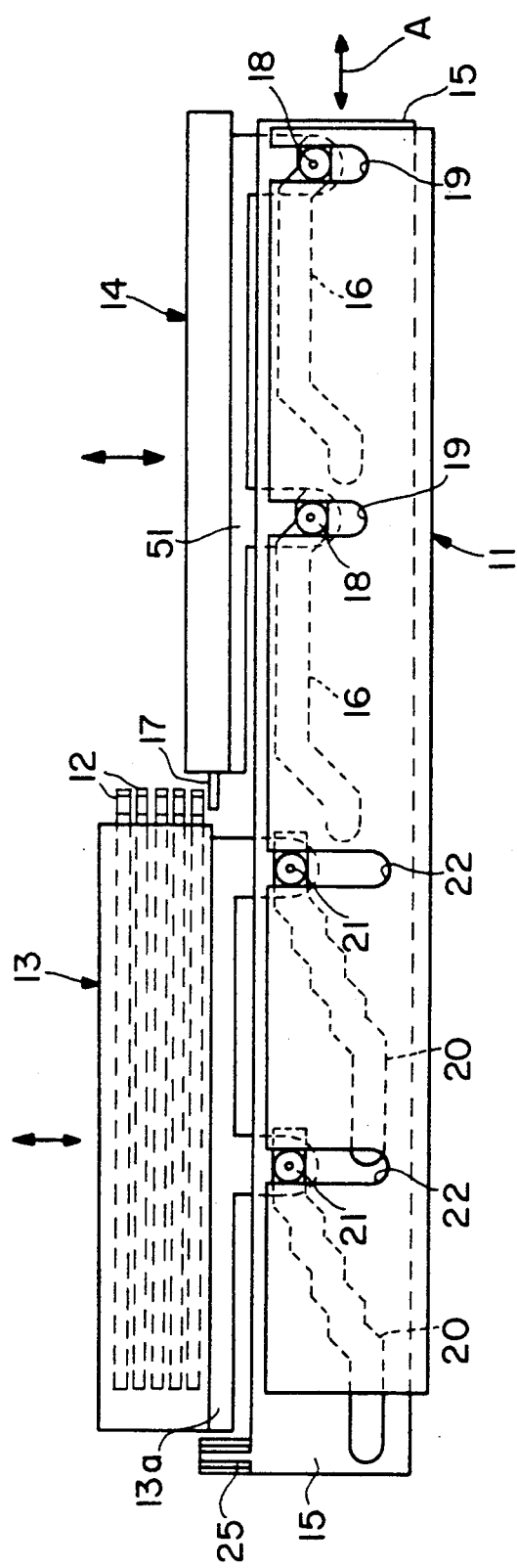
FIG. 1 is a front view of the device of the present invention showing the essential parts thereof.

In FIG. 1, a disk magazine 13 stores several disk trays 12 in layers in its disk storage sections. A housing 14 conveys a disk tray pick-up and storing unit (described later) up and down and to the right and left, or horizontally. Beneath the housing 14 is a disk read-out unit (not shown) provided on the base frame 11.

Figure 3:
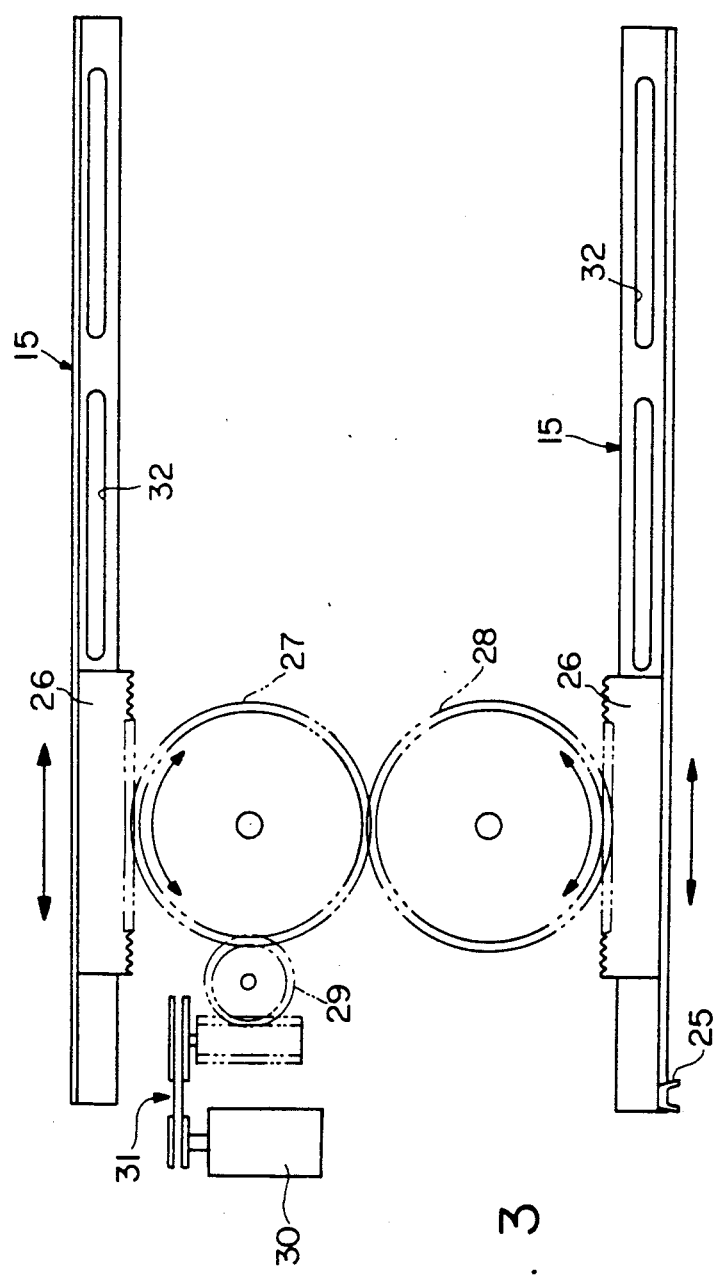
FIG. 3 is a top plan view of the sliding mechanism for the slide plates.

Reference numeral 15 is a slide plate that moves back and forth or reciprocates (to the right and left in the drawing) along the inner surface of the base frame 11 in the direction of the arrow A. The slide plate 15 is provided in a pair as seen in FIG. 3.

Each of the slide plates 15 is provided with two long lateral guide holes 16 and two stepped guide holes 20, which are of the same configuration.

Figure 2:
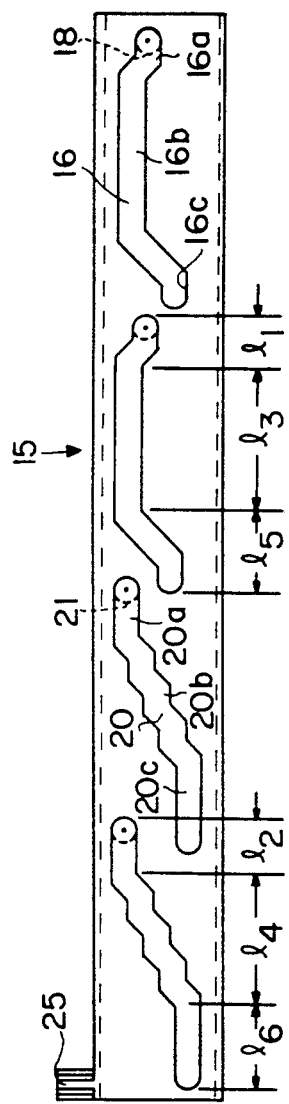
FIG. 2 is a front view of a slide plate used therein.

As seen in FIG. 2, the long lateral guide hole 16 comprises an ascending guide part 16a, a horizontal guide part 16b and a descending guide part 16c, which are continuous.

The ascending guide part 16a guides the housing 14 and raises it slightly via the horizontal guide part 16b. This movement of the housing 14 brings hooks 17 of the disk carrier (described later) to engage with indentation on the disk tray 12 stored in the lowermost storage section of the disk magazine 13. The descending guide hole 16c guides a picked up disk tray to the disk read-out unit.

As seen in FIG. 1, wheels 18 located at the bottom of the housing 14 are rotatably engaged with the guide holes 16. The wheels 18 further engage with vertical guide holes 19 on the base frame 11. Thus, the housing 14 is guided by the rotating wheels 18 engaged with the long lateral guide hole 16.

Referring to FIG. 2, each of the two stepped guide holes 20 has a stepped guide part 20b at the middle. The number of steps formed in the stepped guide part 20b corresponds to the number of the disk trays 12 stored in the disk magazine 13. Being guided by these stepped guide holes 20, the disk magazine 13 is moved up and down so that a desired disk tray is selected and drawn out of the disk magazine 13 and then, later, returned to it.

A base plate 13a, upon which the disk magazine 13 is mounted, is provided with rotary wheels 21 as seen in FIG. 1. The rotary wheels 21 are rotatably engaged with the stepped guide holes 20 so that the wheels 21 can rotate and travel along the guide holes 20. The rotary wheels 21 further engage with vertical guide holes 22 on the base frame 11. The base plate 13a and the disk magazine 13 are thus installed between the guide plates 15.

The relationship between the long lateral guide holes 16 and the stepped guide holes 20, both provided on each of the slide plates 15, is as shown in FIG. 2.

The length $l_1$ of the ascending guide part 16a of the guide hole 16 is about the same as the length $l_2$ of the top step part 20a of the stepped guide hole 20. The length $l_1$ is from a position where the rotary wheels 18 are placed in the ascending guide part 16a to a position where the horizontal guide part 16b starts. Thus, when the slide plates 15 are moved to the right (in the drawing), the rotary wheels 18 rotate and travel upward guided by the ascending guide part 16a and move into the horizontal guide part 16a, thus raising the housing 17.

With such a relationship between the two guide holes 16 and 20, the hooks 17 of the disk carrier are positioned so that the hooks can engage with indentations 23 formed on the disk tray 12 stored in the lowest level of the disk magazine 13 (see FIG. 7). The indentations 23 are in angled C-shape, for example, when seen from the top.

The length $l_3$ of the horizontal guide part 16b of the long lateral guide hole 16 is nearly equal to the stroke length $l_4$ of the stepped guide part 20b, which has one less step than the number of disk trays stored in the disk magazine 13. Thus, after a desired disk tray (including the one at the bottom) is selected and the disk magazine 13 is moved up and down along the guide part 20b in accordance with the position of the selected desk tray, the hook 17 on the disk carrier can remain in the same position as described above.

Further, the length $l_5$ which is between the end of the horizontal guide part 16b and the end of the descending guide part 16c of the long lateral guide hole 16 is about the same as the length $l_6$ of the bottom step part 20c of the stepped guide hole 20. The length $l_6$ is the distance needed when the upper most disk tray in the disk magazine 13 is selected and the wheels 21 for the disk magazine 13 are guided to the right (in the drawing) from the bottom step part 20c.

Thus, the housing 14 descends so that a disk tray 12, which has been drawn out of the magazine 13 by the disk carrier, can be carried and set at a disk read-out position in the read-out unit 24.

Reference numeral 25 in FIG. 2 is a stopper for preventing ejection of the magazine unit 13. The stopper 25 is provided at the left end of one of the slide plates 15 so that the stopper 25 is positioned in front of a magazine compartment (not shown) when the slide plate 15 is slid to the right. Thus, erroneous ejection of the disk magazine can be prevented by the stopper 25.

FIG. 3 shows the sliding mechanism for the pair of slide plates 15. The slide plates 15 are installed on the inner surfaces of the base frame (not shown) and are L shaped in cross section.

Rack gears 26 of specified lengths are provided on the inner sides of the slide plates 15 so that they face each other. Gears 27 and 28 of the same diameter are installed side by side and mesh with each other. The gears also independently mesh with the rack gears 26. The large gear 27 is connected to a reversible motor 30 via a worm wheel 29 and a transmission mechanism 31. Thus, by the rotating action of the gears 27 and 28 which rotate in the opposite directions, the two slide plates 15 can move back and forth in the same direction.

Reference numeral 32 in FIG. 3 are guide holes which engage with a guide pin (not shown) on the base frame 11.

Figure 4:
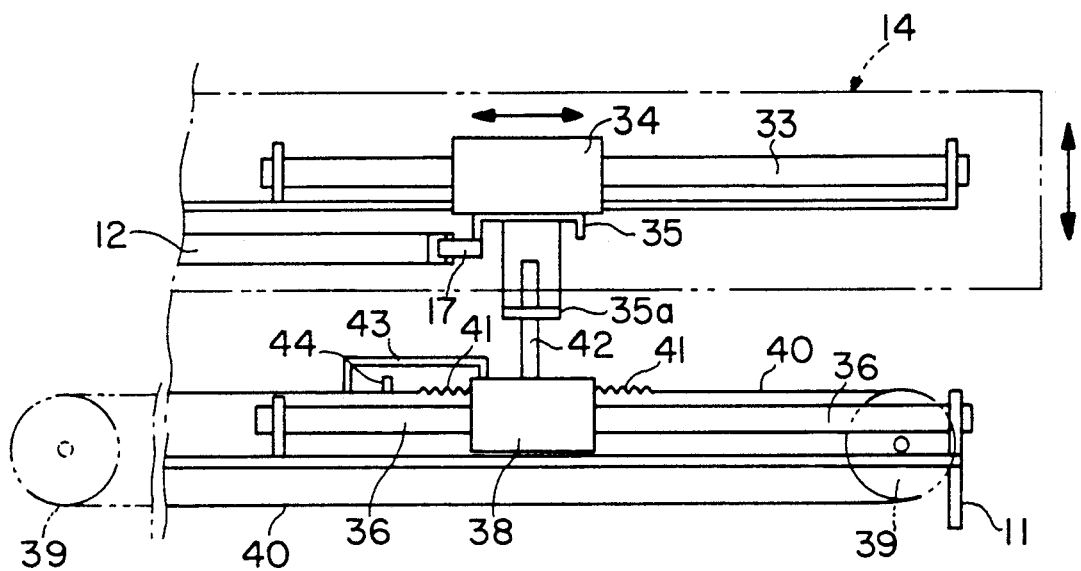
FIG. 4 is a front view of a disk carrier.
Figure 5:
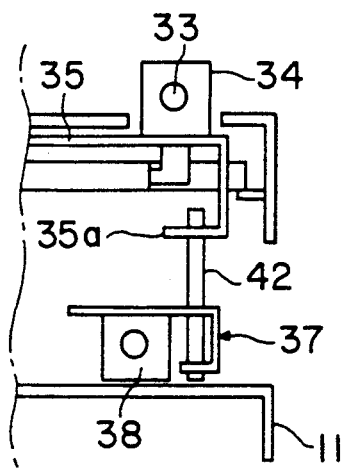
FIG. 5 is a side view of an essential section of FIG. 4.

FIGS. 4 and 5 show a disk carrier A which is provided in the housing 14 and picks up (or pulls out) the disk from the disk magazine 13 and returns it thereto.

In these Figures, guide shafts 33 are provided inside the housing 14. They are parallel to the direction of the in-and-out motion of the disk tray 12.

Movable carriers 34 are mounted respectively on the guide shafts 33. The connecting plate 35 with the hook 17 is bridged between the two movable carriers 34 so that it moves back and forth along the guide shafts 33. The connecting plate 35 moves between two points: A point where the hook 17 engages with the indentation 23 on the disk tray 12 and a point where the disk is played by the disk read-out unit 24.

Other guide shafts 36 are installed on both sides of the base frame 11 so that the guide shafts 36 are underneath the guide shafts 33, respectively; thus, the guide shafts 36 are parallel to the guide shafts 33. A carriage 38, on which a carrier plate 37 is fixed, is slidably mounted on each of the guide shafts 36.

A wire 40 is connected on the right and left sides of the carriage 38 via two pulleys 39 with tension springs 41 in between. The carriage 38 slides back and forth via the rotating motion of the wire 40.

A connecting rod 42 vertically installed on the carrier plate 37 is loosely connected to the bent section of extended end 35a of the connecting plate 35 so that the connecting rod 42 is freely movable vertically. Thus, the back and forth movement of the carriage 38 is transmitted to the carrier 34 (which has the hook 17) via the carrier plate 37, connecting rod 42, bent section 35a, and connecting plate 35 (so that the hook 17 pulls out the disk tray and later returns it to the magazine 13). Also, the housing 14 (which includes the hook 17) is moved up and down when the wheels 18 of the housing 17 are guided along the guide holes 16 of the slide plates 15. Such up and down movement of the housing 17 is not hindered at all since the bent section 35a of the connecting plate 35 is loosely connected to the carriage 38 via the connecting rod 42.

Reference numeral 43 is a control rod. On end of the control rod 43 is attached to the carrier plate 37, and the wire 40 passes through the other end of the control rod 43. A limit block 44 which comes into contact with the inner surfaces of the other end of the control rod 43 is attached to the wire 40. Thus, when the pulleys 39 do not stop rotating (for some reason), the limit block 44 come into contact with the control rod 43 and prevents the tension spring 41 from being cut. As a result, the connection between the carriage 38 and the wire 40 is not hindered. In addition, a reversible motor (not shown) is connected to the shaft of one of the two pulleys 39 via an appropriate transmission mechanism to activate the pulleys 39.

FIG. 7 substantially shows a locking device for locking the disk magazine A in a magazine compartment (not shown). The locking device 45 is L-shaped and is pivotally provided on the base frame 11 at its center. A hooking end 46 formed at one end of the L-shaped locking device 45 engages with an indentation 47 formed in the disk magazine 13. The other end of the locking device 45 is connected to a spring 48 which urges the hooking end 46 into the indentation 47. A narrow opening 49 is provided between the end (to which the spring 48 is connected) and the pivotal center of the locking device 45 so that an operation rod 50 (of a solenoid, for example) is connected to this opening 49.

Thus, when the disk magazine 13 is press-inserted into the magazine compartment which is located between the two slide plates 15, the hooking end 46 of the locking device 45 is pressed by the disk magazine 13 and turns counterclockwise, overwhelming the force of the spring 48. When the disk magazine 13 is inserted all the way to a predetermined set position, the hooking end 46 turns clockwise by the force of the spring 48 and engages with the indentation 47 of the disk magazine 13. As a result, the disk magazine 13 is latched and fixed at a set position.

When the disk magazine 13 is removed, the locking device 45 is first turned counterclockwise via the rod 50 (which moves when the solenoid is activated). Thus, the hooking end 46 disengages from the indentation 47 so that the disk magazine 13 can be removed. Arrow B in FIG. 7 indicates the insertion and removing direction of the disk magazine 13.

Figure 8:
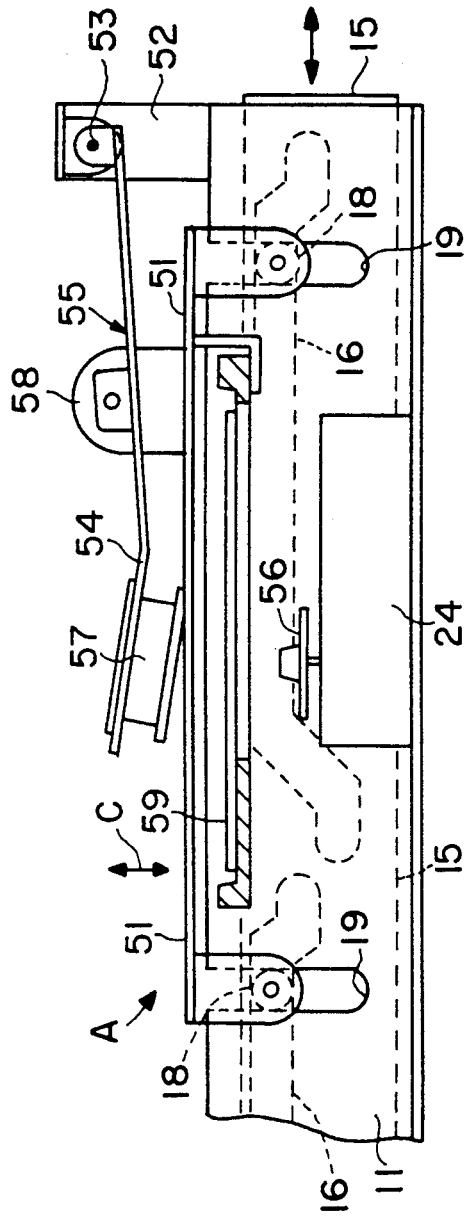
FIGS. 8 and 9 are partially cut-away front views of a disk presser.
Figure 9:
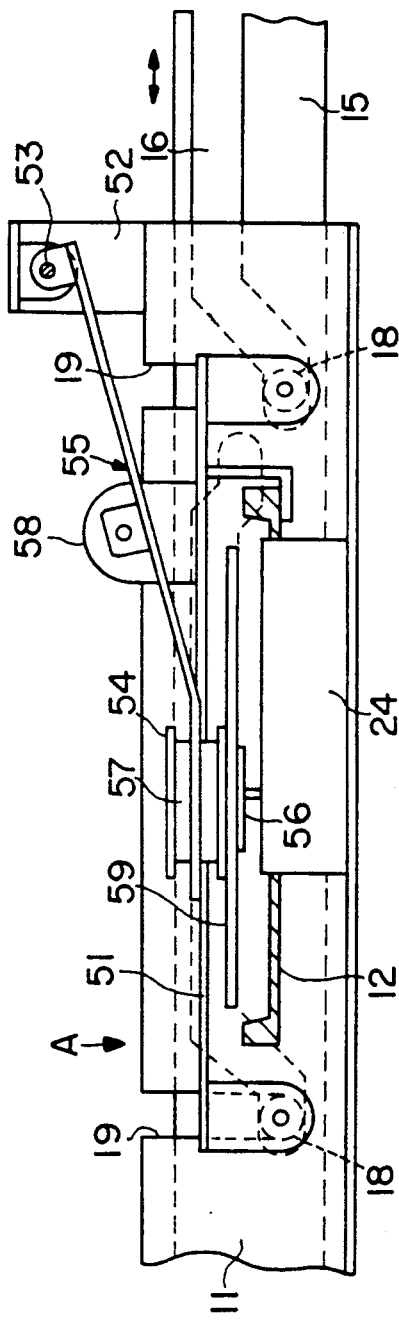
Figure 10:
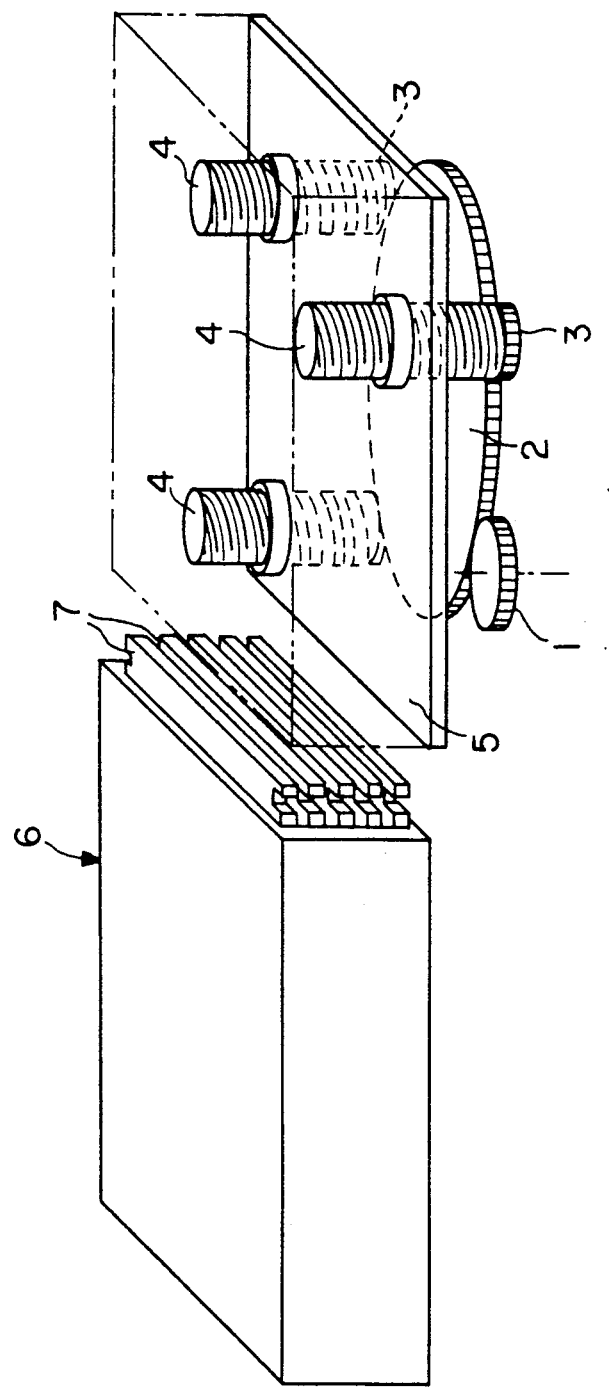
FIG. 10 shows a prior art disk conveying system.

FIGS. 8 and 9 show a pressing mechanism for the disk tray 12.

A platform 51 holds the housing 14 thereon. The rotary wheels 18 are attached to the bottom of the platform 51 and engage with the guide holes 16 and indented guide holes 19.

Stays 52 stand on each side of the base frame 11, and a supporting rod 53 is bridged between the upper ends of the stays 52. An arm 55, having an end portion 54 which is slightly bent upward, is pivotally attached to the central area of the supporting rod 53 at its base. A magnetic presser 57, which is rotatable and movable up and down so as to hold the disk tray 12, is attached to the bent end portion 54 of the arm 55 so that the magnetic presser 57 sets the disk tray 12 on a rotating metal plate 56 of the disk read-out unit 24.

In addition, the arm 55 is rotatably suspended at its midpoint by a pillar 58 on the platform 51 (that is a part of the disk carrier A).

Thus, via the up and down motion of the platform 51 (i.e. the motion of the disk carrier A), the arm 55, connected thereto via the pillar 58, pivots up and down about the shaft 53. When the arm 55 pivots up from the position shown in FIG. 8 to the position shown in FIG. 9 (that is, when the arm 55 pivots downward), the disk 59 is pressed against the metal plate 56. When the arm 55 moves in the reverse and is raised, the disk 59 being pressed by the magnetic presser 57 is released. An arrow C indicates the direction of pivotal movement of the bent end 54 of the arm 55.

Next, the operation of the entire system of the above-described invention will be explained. In the explanation, a disk tray 12 stored in the storage section, for example, second from the bottom of the disk magazine 13 is selected and played.

In FIG. 1, the slide plates 15 on the base frame 11 are first moved to the right (in the drawing). By this linear sliding motion, the rotary wheels 18 (of the platform 51 in which the housing 14 is mounted) located in the ascending guide parts 16a are guided to the horizontal guide parts 16b which are slightly above the ascending guide parts 16a. Thus, the platform 51 and the housing 14 are raised vertically along the vertical guide hole 19 a distance equal to the difference between the two guide parts 16a and 16b.

As a result, the hooks 17 of the disk carrier A in the housing 14 enter the indentations 23 of the lowest disk tray 12 so that they are positioned to be able to engage with each other (see FIG. 7). At this moment, the rotary wheels 21 of the disk magazine 13 are in the upper most step 20a of the stepped guide hole 20.

Then, the slide plates 15 are further moved to the right. In this case, the rotary wheels 18 of the housing 14 stay in the horizontal guide part 16b, and the housing 14 maintains the same position (or the same height). However, the disk magazine 13 is moved down by one step as the rotary wheels 21 of the disk magazine 13 are guided into the step second from the top step part 20a of the stepped guide hole 20. As a result, the hooks 17, which have been stationary, engage with the indentations 2 of the disk tray 12 second from the bottom. At this moment, the right-ward movement of the slide plates 15 is temporarily halted.

A signal is generated upon the temporary halt of the slide plates 15, and the pulleys 39 start rotating (via a driving mechanism), thus, the carriage 38 mounted on the guide shafts 36 of the base frame 11 are moved to the right a predetermined distance via the wire 40.

This causes the carriers 34 to move to the right (in the drawing) along the guide shafts 33 of the housing 14, because the rods 42 standing on the carriage 38 and the extended end bent portion 35a of the connecting plate 35 are connected. As a result, the disk tray 12 engaged with the hooks 17 of the connecting plate 35 is pulled out of the disk magazine 13 and carried to a predetermined position, that is, above the read-out unit 24 installed in the base frame 11. Then, the driving mechanism stops.

When the slide plates 15 are further moved to the right upon this stop signal, the rotary wheels 18 of the housing 14 reaches the descending guide parts 16c of the guide holes 16. The rotary wheels 18 are then lowered along the vertical guide holes 19 of the base frame 11. Thus, the housing 14 is lowered so that the disk 59 held in the disk tray 12 is lowered to the read-out position in the read-out unit 24 and played.

When the guide plates 15 are moved to the right, the rotary wheels 21 of the disk magazine 13 are lead to the bottom step 20c of the stepped guide hole 20 and the disk magazine 13 is lowered to its lowest point along the guide holes 22.

After the disk is played or when a stop signal is generated, the disk tray 12 with the disk 59 therein is returned to the storing section (which is second from the bottom) of the disk magazine 13 by the reverse operation of the slide plates 15.

In addition, when the disk carrier A is moved down, the arm 55 pivots downward (since the arm 55 is connected to the platform 51 via the stay 58). Thus, the magnetic disk presser 57 attached at the bent end of the arm 55 is attracted to the metal plate 56 with the disk 59 in between, and the disk 59 is set stationary.

Furthermore, when the slide plate 15, which is provided with the stopper 25 preventing erroneous ejection of the disk magazine 13, is moved to the right, the stopper (or the erroneous ejection preventing means) 25 comes in front of an entrance of the magazine compartment (not shown) as indicated by the arrow D in FIG. 7. Thus, the disk magazine 13 is prevented from accidentally popping out of the system.

As seen from the above description, according to the present invention:

(a) The housing containing the disk carrier is moved up and down when the housing is guided by the long lateral guide holes formed in the slide plates, and the disk magazine is also moved up and down when the disk magazine is guided by the stepped guide holes which are also formed in the slide plates. Thus, pick-up and return of a selected disk tray is smoothly performed by the disk carrier via the up and down movement of the housing and the disk magazine which is made via a combination of the long lateral guide holes and stepped guide holes. Also, compared to prior art system wherein the disk read-out unit is raised when the disk is played, it is easier in the present invention to design and secure a precise positional relationship between the read-out unit and the disk.

(b) Furthermore, the arm which presses a selected disk is pivotally mounted at one end of the base frame and is rotatably connected at the middle portion to the disk carrier. Thus, the arm can pivot when the disk carrier moves up and down, and pressing and release of the disk can be performed in association with the up and down motion of the disk carrier. Accordingly, the overall structure is simple, less costly to manufacture and is small in size compared to prior art systems in which the disk is pressed so as to be stationary by a mechanism which is independent from the disk pick-up mechanism.

(c) In addition, in the present invention, a means to prevent erroneous ejection of the disk magazine is provided at the end of the slide plate so that during operation the ejection preventing means is in front of the entrance of the disk magazine compartment. Thus, the disk magazine will not erroneously be ejected to break. Also, no special measure need to be taken to prevent erroneous ejection, the entire system is simple, less costly to manufacture and smaller in size than conventional systems.

We claim:

1. An automatic disk carrying and playing device in which individual disk trays are stored in stratified storage sections of a disk magazine, indentations formed in corners of each one of the disk trays adapted to engage with hooks on a disk carrier provided in a housing, a selected disk tray is carried to a disk read-out unit installed on a base frame by moving said hooks, and a disk tray of which a disk has been played is returned and stored in one of the storage sections of said disk magazine, wherein a pair of slide plates, which move back and forth in parallel with a direction in which said disk tray is drawn out and returned, are provided on said base frame, and each of said slide plates is provided with long lateral guide holes which support and guide said housing and stepped guide holes which support and guide said disk magazine so that:

said long lateral guide hole consists of:
an ascending guide part by which said housing is raised from a starting position to a position where said hooks are engaged with indentions on each one of said disk trays;
a horizontal guide part having a length corresponding to the number of disk trays housed in said disk magazine; and
a descending guide part along which a drawn out disk tray is lowered to a specified read-out position in said read-out unit; and
each of said stepped guides hole has a stepped guide part having steps which correspond in number to the number of disk trays in said disk magazine and a guide part which corresponds to said descending guide part along with one of said disk trays which is lowered to said read-out position of said read-out unit.

2. An automatic disk carrying and playing device according to claim 1, further comprising an arm which has a magnet presser at one end and is pivotally mounted at another end of said base frame, said arm being rotatably connected to said disk carrier at a middle portion thereof.

3. An automatic disk carrying and playing device according to claim 1 or 2, further comprising a disk plate erroneous ejection preventing means at one end of one of said slide plates, said erroneous ejection preventing means normally being positioned outside of an insertion opening for said disk magazine and being positioned in front of said insertion opening when said device is in operation.

4. An automatic disk carrying and playing device according to claim 1, further comprising pressing arm pivotally mounted on said base frame, said pressing arm being provided with a disk presser at a free end and rotatably connected to said disk carrier at a middle portion thereof.

5. An automatic disk carrying and playing device comprising:
   a base frame;
   a pair of parallel slide plates provided on said base plate so that said slide plates reciprocate on said base frame;
   a disk magazine provided between said slide plates, said disk magazine storing therein disk trays one on top of each other and each of said disk trays being formed with indentations;
   a disk carrier with hooks which engage with said indentations on said disk trays to draw out said disk trays, said disk carrier, provided between said slide plates, being movable up and down and toward and away from said disk magazine; and
   a disk playing unit provided beneath said disk carrier; wherein each of said slide plates is provided with long lateral guide holes which support and guide said disk carrier and stepped guide holes which support and guide said disk magazine, said long lateral guide holes consisting of:
   an ascending guide part which raises said disk carrier to a position where said hooks are engaged with said indentations of one of said disk trays;
   a horizontal guide part continuous with said ascending guide part having a length corresponding to a total height of said disk trays in said disk magazine; and
   a descending guide part continuous with said horizontal guide part, said descending guide part lowering a selected one of the disk trays to a disk read-out position in said disk read-out unit; and
   each of said stepped guides hole having a stepped guide part having steps which correspond in number to the number of disk trays in said disk magazine and a bottom guide part which is continuous with said stepped guide part and is substantially the same in length as said descending step part.

6. An automatic disk carrying and playing device according to claim 5 or 4, further comprising a stopper provided on one of said slide plates so that when one of said slide plates is moved said stopper is positioned in front of said disk magazine to prevent said disk magazine from being ejected.

* * * * *